Aug. 2, 1960        N. P. STOATE        2,947,877
APPARATUS FOR DETECTING FOREIGN BODIES IN TRANSPARENT VESSELS
Filed Dec. 3, 1956        2 Sheets-Sheet 1
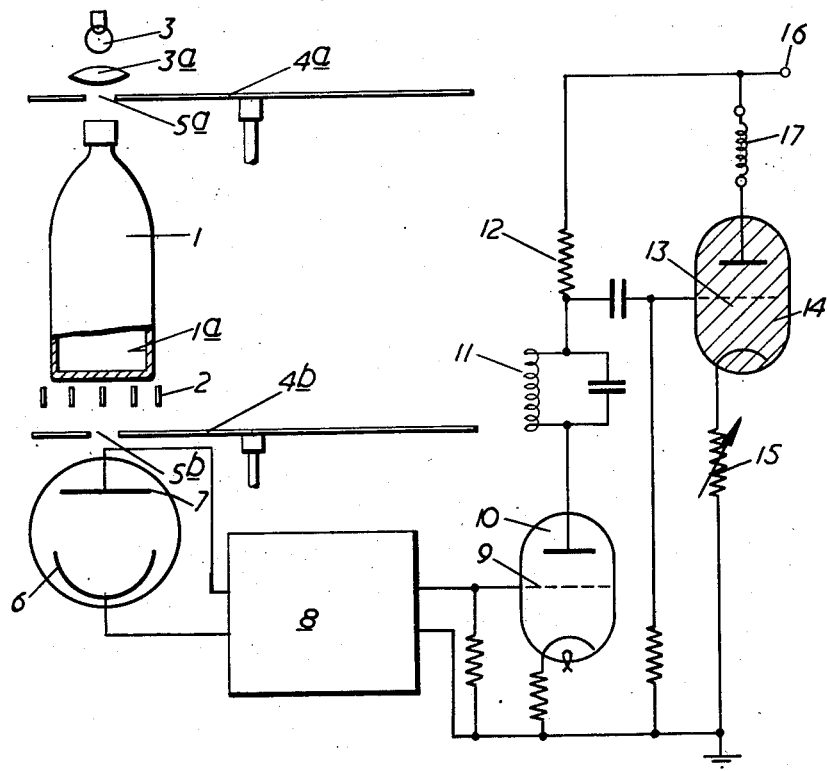
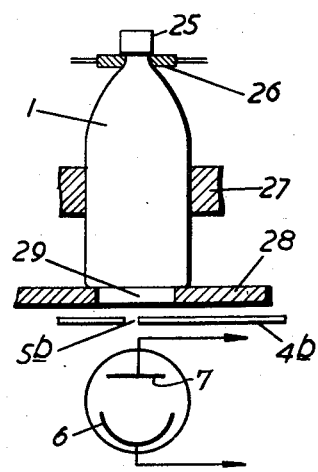
Inventor
NORMAN P. STOATE
By Aug. 2, 1960   N. P. STOATE   2,947,877
APPARATUS FOR DETECTING FOREIGN BODIES IN TRANSPARENT VESSELS
Filed Dec. 3, 1956   2 Sheets-Sheet 2
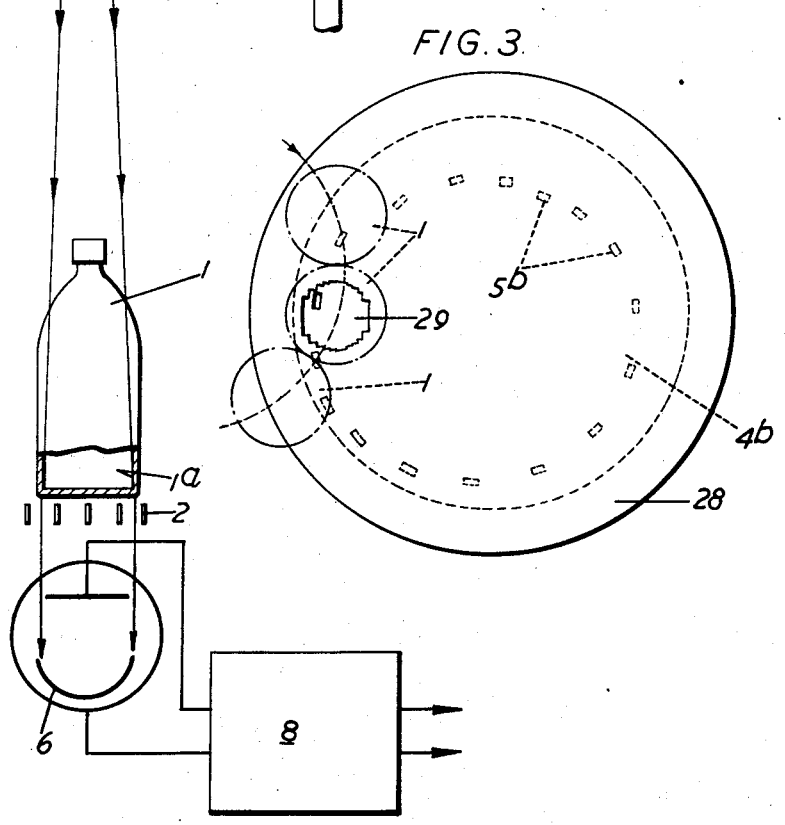
Inventor
NORMAN P. STOATE United States Patent Office 2,947,877
Patented Aug. 2, 1960

2,947,877

APPARATUS FOR DETECTING FOREIGN BODIES IN TRANSPARENT VESSELS

Norman Parker Stoate, London, England, assignor to U.D. Engineering Co. Limited, London, England, a British company Filed Dec. 3, 1956, Ser. No. 626,031

Claims priority, application Great Britain Dec. 9, 1955

13 Claims. (Cl. 250—219)

The present invention relates to apparatus for scanning transparent vessels such as milk bottles for example for detecting foreign bodies therein.

The main object of the present invention is to provide apparatus for scanning transparent vessels to detect transparent foreign bodies therein of such a size that they will deflect light beams passed through the vessels to a degree which can be detected by suitable detectors even when the materials of the vessels as at their corners for example also deflects the light beams.

Further objects of the invention are to provide such an apparatus whereby the scanning of the vessels can be effected without interrupting the mechanical movement of the vessels between two positions, for example, between a bottle cleaning machine and a bottle filling machine, and whereby the scanning system can be readily adapted to scan vessels of different sizes.

According to the present invention an apparatus for detecting the presence of a foreign transparent body in a transparent vessel having axially disposed mouth and bottom comprises a device for casting a rapidly pulsating light beam through the vessel mouth and its transparent bottom the pulsations in the light beam being substantially steady, means for scanning the whole area of the vessel bottom within the walls thereof, a photo-electric device disposed to intercept the light beam emanating from the transparent vessel bottom and adapted to be connected to a recording device including a highly tuned rejector circuit, and means for causing the photoelectric device to receive a scan of the whole area of the vessel bottom within the walls thereof by the projection thereon successively by the pulsating light beam of portions of the said vessel bottom area, whereby when the beam strikes a transparent object in the vessel the light beam pulsations will be at least partially distorted and such distortions will engender a change of the electric impulses in said circuit from a regular to non-regular wave form capable of passing the rejector circuit and be recorded by the recording device.

The recording device is connected to the vessel advancing mechanism in such a manner that on the presence of a transparent foreign body being detected in the vessel, the vessel will be removed from the advancing mechanism or the advancing mechanism may be halted.

The photo-electric device may be a photo-electric cell which, when the pulsations of the light rays striking it are distorted by the presence of a foreign body in the vessel, will cause the wave form of an electric pulse to vary from a regular to a non-regular form and thus result in a device such as an electric relay actuating a device to remove the vessel or stop the vessel advancing mechanism.

The light source in one preferred construction is provided by the fluorescent screen of a cathode ray tube and pulsating light beam emitted by the screen is created by modulating the cathode ray. The pulsating light beam is preferably caused to scan the bottom of the vessel within the walls thereof disposed in the beam by causing the cathode ray to scan the tube screen in any known manner by disposing electromagnets round the exterior of the tube or by the provision of electrostatic plates inside the tube as is well known in the art. Preferably this scan is of a spiral shape.

In another preferred construction the light source is provided by a light such as an electric filament lamp and the pulsating beam is created by passing an apertured mask rapidly across the light beam. An opaque scanning plate having a number of apertures therein may be disposed in the path of the pulsating light beam so that said beam is caused to scan the whole area of the vessel bottom within the walls thereof disposed in the beam.

In either of these preferred constructions a lens may be disposed in the light beam to focus the beam onto the portion of the bottom of the vessel bounded by the inner surfaces of the walls of the vessel.

A number of lenses may be mounted on a turret movably disposed in the frame of the apparatus whereby a selected lens may be disposed in the light rays from the steady light source whereby the apparatus may be used in detecting foreign bodies in translucent vessels of various sizes.

The vessel being scanned may be supported on a grid or the like above the photo-electric device which is beneath the vessel or may be supported by its neck or side walls above an aperture through which the light rays pass to the said photo-electric device.

The photo-electric device in a preferred construction comprises at least one photo-electric cell and the photo-electric device when it detects changes in the light pulses due to a foreign body in the vessel will emit an electric impulse or electronic signal of non-regular wave form and is connected in circuit with a sharply tuned rejector tuned to the same frequency as the light source which rejector will permit said impulses of non-regular wave form to pass and is connected to the grid of a gas filled relay or like device the output of which forms the signal recording a foreign body in the vessel.

In order that the invention may be more clearly understood some constructions in accordance therewith will now be described, by way of example, with reference to the accompanying drawings, in which:

Figure 1 shows a diagrammatically one construction of apparatus for detecting transparent foreign bodies in milk bottles between a filling station (not shown) and a capping station (not shown);

Figure 2 shows diagrammatically an alternative apparatus connected to an amplifier circuit similar to that shown in Figure 1;

Figure 3 is a plan view of the mask shown in Figures 1 and 4; and

Figure 4 shows diagrammatically an alternative way of holding the vessel being scanned.

In the drawings the same references are used to designate the same or similar parts.

Referring to Figure 1, milk bottles of which bottle 1 is shown, are advanced along a support 2 shown in cross-section which has an open construction such as a grid through which light rays will pass. Above the scanning station a lamp 3 is disposed so that when a bottle 1 having axially aligned mouth and bottom is located in the scanning position the light rays emanating from the lamp will pass vertically downwards i.e. axially through the bottle and the support 2. A lens 3a is disposed in the path of the light rays to focus the rays on the portion of the bottle bottom bounded by the inner surfaces 1a of the walls of the bottle.

The pulsations in the light beam are produced by a mask in the form of a disc 4a rotatably mounted with respect to the lamp 3 and grid 2.

The disc 4a has one or more apertures 5a therein at such a position that when each aperture 5a crosses the beam the light rays from the lamp 3 will pass vertically through the aperture and strike a photo-electric member such as a photo-electric cell 6 disposed beneath the disc 4a and vertically beneath the lamp 3. Thus by rotating the disc 4a at high speed light rays will intermittently pass through each aperture 5a, in the form of pulsations having a steady beat which can be expressed in the form of a sine wave or the equivalent i.e. a square wave, which however will not be a perfect square wave as it is not possible to cut off the light beam instantaneously.

In order that the bottle shall be scanned to detect any foreign body therein, a scanning disc 4b is rotatably mounted beneath the grid 2 and above the photo-electric device 6 described herein, the axis of rotation of the disc 4b being offset from and parallel to the axis of the light beam passing through the bottle. The disc 4b has a number of apertures 5b of the same diameter, Figure 3, spirally disposed therein such that as each aperture passes from beneath the part of the bottle bottom within the walls thereof another aperture will begin to scan across the bottle bottom; thus in the course of rotation the rays of the light beam which pass through the apertures 5b will scan in succession the whole of the area of the bottom of the bottle within the walls thereof. This spiral scanning disc 4b is rotated at very high speed, e.g. 10,000 r.p.m. and the mask disc 4a is rotated at a much higher speed out of phase with the speed of rotation of the disc 4b.

If any transparent object is present in the bottle 1, the regular pulsations in the light rays will be distorted and this distortion will be detected by the photoelectric cell which in turn will engender a change of the electric impulses in said circuit from a regular to non-regular wave form capable of passing the rejector circuit and, to be described; the wave form of the resultant electric impulse being non-regular will pass the rejector circuit and this signal can be employed to cause a normal mechanism to eject the bottle or stop the bottle feeding mechanism; such mechanism however forms no part of this invention and is not further described herein.

The cathode 7 of the photoelectric cell is connected to an amplifier circuit so that the regular light beam pulsations striking the cell will result in electric impulses being initiated by the cell, the impulses being in substantially sine wave form.

The cell is in circuit with an amplifier 8 of known construction in the circuit shown in Figure 1. The amplifier is connected to the grid 9 of a thermionic valve 10, in the anode circuit of which is a sharply tuned rejector circuit 11 tuned to the same frequency as the supply to the lamp 3; the circuit 11 is followed by a conventional resistance capacity coupling 12 applied to the grid 13 of a gas filled relay tube 14, the output of which forms the final signal circuit.

The cell is in circuit with an amplifier 8 of known construction in the circuit shown in Figure 1. The amplifier is connected to the grid 9 of a thermionic valve 10, in the anode circuit of which is a sharply tuned rejector circuit 11 tuned to the same frequency as the supply to the lamp 3; the circuit 11 is followed by a conventional resistance capacity coupling 12 applied to the grid 13 of a gas filled relay 14, the output of which forms the final signal circuit.

The sine or equivalent regular pulsating wave output from the amplifier 8 will not pass the rejector circuit 11 and the gas filled relay 14 will be unaffected. When however the light beam strikes a transparent particle in the bottle 1 the light beam pulsations striking the edge of the particle will be distorted and the pulsating waves from the cell 7 reaching the valve 10 will also be distorted.

The rejector circuit is a finely tuned circuit and may be what is known as a rejector or an acceptor. Such circuits will not allow a regularly pulsating signal in the circuit to pass, but will permit a non-regular signal to pass. It is known that any wave form which is non-regular is an integration of a regular wave form, such as a sine wave, and another wave form. Thus when the regular light pulses pass through the bottle, they create a regular wave signal in the rejector circuit which being highly tuned rejects the signal; when the pulsating light rays strike the edge of a glass chip or other transparent particle in the bottle, the rays will be deflected due to the refractive index of the particle at its edges and thus the light pulsations reaching the cell 7 will be distorted by the integration of the regular and non-regular light waves resulting from this deflection. This irregular wave will result in a similar irregularly pulsating signal reaching the rejector circuit 11 which will allow a signal to pass onto the grid 13 of the gas filled relay 14; the relay 14 will in turn be biased by a resistor 15 so as to fire when triggered by the grid 13. The circuit is provided with a high tension input 16 and the signal created by the operation of the relay 14 will form the output from the circuit at 17 which is connected to a device for actuating the bottle ejection or bottle feeding mechanism to eject the bottle from the feed or halt the feed of bottles to allow the bottle to be removed.

The sine or equivalent pulsating wave output from the amplifier 8 will not pass the rejector circuit 11 and the gas filled relay tube 14 will be unaffected. When however a transparent particle is detected in the bottle 1 by distortion of the light beam pulsations striking the edge thereof, the pulsating light waves reaching the valve 10 will be distorted to a substantial degree into a non-regular wave form such that the distorted impulses in the circuit will pass the rejector circuit 11 onto the grid 13 of the gas filled relay tube 14, which in turn will be biased by a resistor 15 so as to fire when triggered by the grid 13. The circuit is provided with a high tension input 16 and the signal created by the operation of the relay tube 14 will form the output from the circuit at 17 which is connected to a device for actuating the bottle ejection or bottle feeding mechanism to eject the bottle from the feed or halt the feed of bottles to allow the bottle to be removed.

Figure 2 shows a modified scanning apparatus connected to an amplifier circuit similar to that shown in Figure 1 of which only the amplifier 8 is shown in Figure 2.

Referring to Figure 2, the light source shown therein is the fluorescent screen 18 of a cathode ray tube 19. The pulsations in the light source, and hence in the beam directed through the bottle 1 to the light sensitive device such as a photoelectric cell 6, are created by modulating the cathode ray by any known method, such as by varying the potential on the control grid 20 of the tube.

In order to scan the bottle bottom with the pulsating light beam the cathode ray emitted by the gun 21 of the tube is caused to scan the screen 18; preferably four electro-magnets 22 (of which two are shown in Figure 2) are disposed equi-spaced round the neck of the tube in a known manner and are preferably energized in a known sequence to cause a spiral scan of the screen.

In the construction shown in Figure 2, a lens 3a may be provided as in Figure 2, to focus the light rays of the beam onto the portion of the bottle bottom bounded by the surfaces 1a. Also the cathode ray may be caused to scan the screen 18 in any known manner. The detection of foreign bodies in the bottles by distortion of the light beam affecting the cell 6 is the same as herein described with reference to Figure 1.

As the apparatus is preferably capable of scanning bottles or other vessels of different dimensions a number of lenses 23 may be mounted on a turret 24 as shown in Figure 2 whereby a selected lens appropriate for the size of vessels being scanned may be disposed in the light beam.

In Figures 1 and 2 the bottle is shown as supported on a grid 2 through which light rays will pass, but it may be supported about its neck 25 by guides 26 or by members 27 which grip its side walls or by both guides 26 and members 27 as shown in Figure 4; the bottle is suspended in this way above an opaque screen 28 having an aperture 29 therein beneath which is the cell 6, the screen preventing any light rays other than those passing through the bottle bottom reaching the cell 6.

The advantage of the construction shown in Figure 2 compared with that in Figure 1 is that the employment of the cathode ray tube for producing the pulsating light beam, is that it avoids any inertia in the rotating discs 4a and 4b and enables the scanning to be controlled by simple action as by movement of a switch. Also rather than employing the turret 24 with different lenses a lens which will focus the beam over the whole of the bottom of the largest size of bottle to be scanned, may be employed, and the scanned zone of the screen 18 varied for smaller vessels.

Any suitable method of connecting the circuit output 17 to the bottle feeding or ejection device may be employed with either construction and is not further described as it forms no part of this invention.

I claim:

1. An apparatus for detecting the presence of at least one foreign transparent body in a vessel having a transparent mouth and a transparent bottom axially disposed, comprising a cathode ray tube, means for modulating the cathode ray in said tube to cause a steadily pulsating light source on the fluorescent screen of said tube disposed to cast a pulsating light beam, means disposed to support said vessel in said beam, means for causing said light beam to scan the bottom of the vessel within the walls thereof, a photo-electric device disposed in said beam means for causing that part of said beam which passes through the bottom of the vessel within the walls thereof to scan said vessel bottom, and an electric circuit including said photo-electric device, a sharply tuned rejector circuit, a gas filled relay tube, and an output terminal connected to the grid of said relay tube whereby when the beam strikes a transparent object in said supported vessel the beam pulsations will be at least partially distorted and such distortion will engender a disturbance of the electric impulses produced by said photo-electric cell from a regular wave form that is rejected or not passed by said rejector circuit so that the electric circuit remains inactive, to a non-regular wave form which will pass the rejector circuit and energize the electric circuit.

2. An apparatus for detecting the presence of at least one transparent foreign body in a transparent vessel having an axially disposed mouth and bottom comprising a steady light source disposed to cast a steady light beam, means disposed to support said vessel in said beam, an apertured mask disposed in the path of said beam, means for moving said mask rapidly across said beam to create steady pulsations in said beam passing through said vessel, an opaque scanning member having a number of apertures therein disposed in the path of said beam emanating from said vessel, means to move said scanning member rapidly across said beam to scan all parts of said beam passing through said vessel bottom, a photo-electric device disposed in said beam and an electric circuit including said photo-electric device, a highly tuned rejector circuit, a gas filled relay tube, and an output terminal connected to the grid of said relay tube whereby when the beam strikes a transparent object in said supported vessel the beam pulsations will be at least partially distorted and such distortion will engender a disturbance of the electric impulses produced by said photo-electric cell from a regular wave form that is rejected or not passed by said rejector circuit so that the electric circuit remains inactive, to a non-regular wave form which will pass the rejector circuit so as to provide a signal at said output terminal.

3. An apparatus for detecting the presence of foreign transparent bodies in transparent vessels having axially disposed mouths and bottoms comprising a device for casting a light beam through the mouth and the transparent bottom of the vessel, means for causing uniform pulsations in the light beam, a photo-electric cell disposed to intercept the light beam after it has passed through the vessel bottom, a control circuit including an accurately tuned rejector circuit connected to said photo-electric cell and tuned to the frequency of the pulsations of the light beam and allowing a signal to pass to the recording device only when this frequency is disturbed, means for causing the pulsating light beam to scan the whole area of the vessel bottom within the walls thereof whereby when the beam strikes a transparent object in the vessel, the light beam pulsations will be distorted and such distortion will engender a disturbance of the electric impulses produced by said photo-electric cell from a regular wave form that is rejected or not passed by said rejector circuit so that the control circuit remains inactive, to a non-regular wave form which will pass the rejector circuit and energize the control circuit, a turret being movably disposed and rotatable about an axis offset from the axis of the light beam, said turret being disposed between the device for casting a light beam and the vessel and having a number of lenses of different sizes secured therein so as to be selectively disposed in the light beam to focus the beam on to the portion of the vessel bottom bounded by the inner surfaces of the walls thereof.

4. An apparatus for detecting the presence of foreign transparent bodies in transparent vessels having mouths and bottoms, comprising a device for casting a light beam through the transparent bottom of the vessel, means for causing uniform pulsations in the light beam, a photo-electric cell disposed to intercept the light beam after it has passed through the vessel bottom, a control circuit including an accurately tuned rejector circuit connected to said photo-electric cell, and means for causing the pulsating light beam to scan the whole area of the vessel bottom within the walls thereof whereby when the beam strikes a transparent object in the vessel, the light beam pulsations will be distorted and such distortion will engender a disturbance of the electric impulses produced by said photo-electric cell from a regular wave form that is rejected or not passed by said rejector circuit so that the control circuit remains inactive, to a non-regular wave form which will pass the rejector circuit and energize the control circuit.

5. An apparatus for detecting the presence of foreign transparent bodies in a transparent vessel having its mouth and bottom axially aligned, comprising a cathode ray tube, means for modulating the cathode ray in said tube to cause a uniform pulsating light source on the fluorescent screen of the cathode ray tube, said tube being disposed so as to cast a pulsating light beam through the transparent bottom of said vessel, a photo-elctric cell disposed to intercept the pulsating light beam after it has passed through the vessel bottom, a control circuit connected to the photo-electric cell and including an accurately tuned rejector circuit, means for causing the said light beam to scan the bottom of the vessel with the walls thereof whereby when the beam strikes a transparent object in the vessel, the light beam pulsations will be distorted and such distortion will engender a change of the electric impulses received by said rejector circuit from the photo-electric cell from a regular wave form that is rejected or not passed by said rejector circuit so that the control circuit remains inactive, to a non-regular wave form which will pass the rejector circuit and energize the control circuit.

6. An apparatus for detecting the presence of foreign transparent bodies in transparent vessels having their mouths and bottoms axially aligned, comprising a steady light source disposed to cast a light beam through said vessel and the transparent bottom within the walls thereof, an apertured mask disposed in the path of said beam, means for moving said mask rapidly across said beam to create uniform pulsations in said light beam, a photo-electric cell disposed to intercept the pulsating light beam after it passes through the vessel bottom, a control circuit to which said photo-electric cell is connected and including a tuned rejector circuit, and means for causing the light beam to scan the whole area of the vessel bottom within the walls thereof whereby when the beam strikes a transparent object in the vessel, the light beam pulsations will be distorted and such distortion will engender a change of the electric impulses produced by said photo-electric cell from a regular wave form that is rejected or not passed by said rejector circuit so that the control circuit remains inactive, to a non-regular wave form which will pass the rejector circuit and energize the control circuit.

7. An apparatus according to claim 6 characterized in that the means for causing the light beam to scan the vessel bottom includes an opaque rotatable scanning plate having a number of apertures spirally arranged therein and disposed in the path of the vessel with the pulsating light beam passing therethrough so that the photo-electric cell receives portions of the pulsating light beam representing a scan of the whole of the interior bottom surface of a vessel disposed in the beam.

8. An apparatus for detecting the presence of foreign transparent bodies in transparent vessels having axially aligned mouths and bottoms, comprising means for supporting a transparent vessel, a device for casting a light beam through the vessel and its transparent bottom, means for causing substantially uniform pulsations in the light beam, a photo-electric cell disposed to intercept the pulsating light beam after it passes through the vessel bottom, a control circuit including an accurately tuned rejector circuit to which the photo-electric cell is connected, and means for causing the pulsating light beam to scan the whole area of the vessel bottom within the walls thereof so that when the beam strikes a transparent object in the vessel, the light beam pulsations will be distorted and such distortions will engender a change of the electric impulses produced by said photo-electric cell from a regular wave form that is rejected or not passed by said rejected circuit so that the control circuit remains inactive, to a non-regular wave form which will pass the rejector circuit and energize the control circuit.

9. An apparatus according to claim 6 characterized in that the mask comprises a disc mounted for rotation about an axis offset but parallel to the axis of the light beam and having one or more apertures therein of such a size that the rays of the light beam passing therethrough will strike only the portion of the vessel bottom bounded by the inner surfaces of the vessel walls.

10. An apparatus according to claim 4 characterized in that a lens is disposed in the light beam to focus the beam onto the portion of the bottom of the vessel bounded by the inner surfaces of the walls of the vessel.

11. An apparatus according to claim 4 characterized in that a turret is movably disposed and rotatable about an axis offset from the axis of the light beam, said turret being disposed between the device for casting a light beam and the vessel, and a number of lenses of different sizes secured to said turret, whereby on movement of the turret a selected lens can be disposed in said light beam to focus the beam onto the portion of the bottom of said vessel bounded by the inner surfaces of the walls of said vessel.

12. An apparatus according to claim 8 characterized in that said vessel supporting means comprises a grid-like device disposed above said photo-electric cell.

13. An apparatus according to claim 8 characterized in that said vessel supporting means comprises a device disposed to engage the neck and the side walls of said vessel, an apertured member being disposed beneath said supported vessel through which said beam passes to said photo-electric cell.

References Cited in the file of this patent

UNITED STATES PATENTS

| | | |
|---|---|---|
| 2,317,559 | Stout | Apr. 27, 1943 |
| 2,431,519 | Stoate | Nov. 25, 1947 |
| 2,454,412 | Stoate | Nov. 23, 1948 |
| 2,561,529 | Mongan et al. | July 24, 1951 |
| 2,593,127 | Fedorchak | Apr. 15, 1952 |
| 2,636,602 | Stoate et al. | Apr. 28, 1953 |
| 2,750,519 | Summerhayes, et al. | June 12, 1956 |

FOREIGN PATENTS

| | | |
|---|---|---|
| 680,286 | Great Britain | Oct. 1, 1952 |